United States Patent [19]

Shimkus

[11] Patent Number: 4,507,799
[45] Date of Patent: Mar. 26, 1985

[54] X-RAY FILM SUPPORT

[76] Inventor: John W. Shimkus, 690 Castleton Ave. Apt. 2B, Staten Island, N.Y. 10310

[21] Appl. No.: 429,226
[22] Filed: Sep. 30, 1982
[51] Int. Cl.³ .............................................. G03B 41/16
[52] U.S. Cl. .................................... 378/177; 378/180
[58] Field of Search ................................ 378/177, 180
[56] References Cited

U.S. PATENT DOCUMENTS 3,633,028  1/1972  Marino ................................ 378/180

Primary Examiner—Craig E. Church
Attorney, Agent, or Firm—Charles E. Baxley

[57] ABSTRACT

An X-ray film support is adapted for providing X-ray pictures of the extremities of the human body from a variety of directions with a relatively simple structure formed of a front leg and a back leg which are joined together by a lower brace and an upper brace. The upper brace is used for support of the extremity such as a hand or a foot while the lower brace has stirrups extending laterally therefrom for the support of X-ray film cassettes. The legs are of adjustable length for aligning the object being X-rayed with the center of the film cassette. Also, the braces are of adjustable length so that, by a telescoping action of the legs and braces to their minimum lengths, the film support can be reduced to a relatively small size for convenience in stowage and for adjustment to limb length. A fold-over flap is secured to a back end of the upper brace for draping over the upper brace and beneath the object being X-rayed so as to provide a space between the upper brace and the flap wherein a film cassette may be positioned for photographing the object from underneath. A binding strap secures the object to the flap adjacent its connection with the upper brace.

6 Claims, 2 Drawing Figures

X-RAY FILM SUPPORT

BACKGROUND OF THE INVENTION

This invention relates to radiology and, more particularly, to a holder for supporting film for X-ray pictures of the extremities of the human body.

The taking of X-ray pictures is an often-used diagnostic tool of the physician. Such pictures are frequently taken to diagnose injuries such as fractures to the hand and to the foot. Due to the complexity of the physical structure of the hand and the foot, it may be desirable to take a number of pictures from different directions so as to better determine the exact nature of the injury.

Sometimes a diagnosis can be more readily made by holding or twisting the hand or foot in a specific direction. Accordingly, a number of devices have been disclosed for such purposes. By way of example, such devices are taught in the U.S. Pat. Nos. 2,146,913 of Piotrowski; 3,521,876 of Smith; 4,320,749 of Highley and 4,323,080 of Melhart. The devices set forth in the foregoing patents suffer from the disadvantages of being more cumbersome and complex than is required in many radiographic situations, or from lacking a device for holding X-ray film in a number of positions as is required in many situations.

SUMMARY OF THE INVENTION

The aforementioned problems are overcome by an X-ray film support incorporating the invention which can hold a cassette of X-ray film in a variety of positions relative to an extremity of the human body which is also secured to the support. The structure of the X-ray film support is relatively simple so as to avoid the cumbersome and complex nature of holding devices of the prior art.

In accordance with the invention, the X-ray film support includes upper and lower braces which are joined by legs at the front and back ends of the braces. The legs and the braces may be structured in a telescoping format so as to permit adjustment of the size of the film support. The subject which is to be photographed, typically an arm or foot, is secured to the top brace. Stirrups extending from the lower brace at the sides and front thereof securely hold and position an X-ray cassette alongside the subject, either to the right side, to the left side, or to the front of the subject for three separate views. A fourth view, looking up at the subject, is provided by a fold-over flap secured at the back end of the upper brace to provide a space between the flap and the brace for holding an X-ray cassette.

BRIEF DESCRIPTION OF THE DRAWING

The foregoing aspects and other features of the invention are explained in the following description, taken in connection with the accompanying drawings wherein.

DETAILED DESCRIPTION

Figure 1:
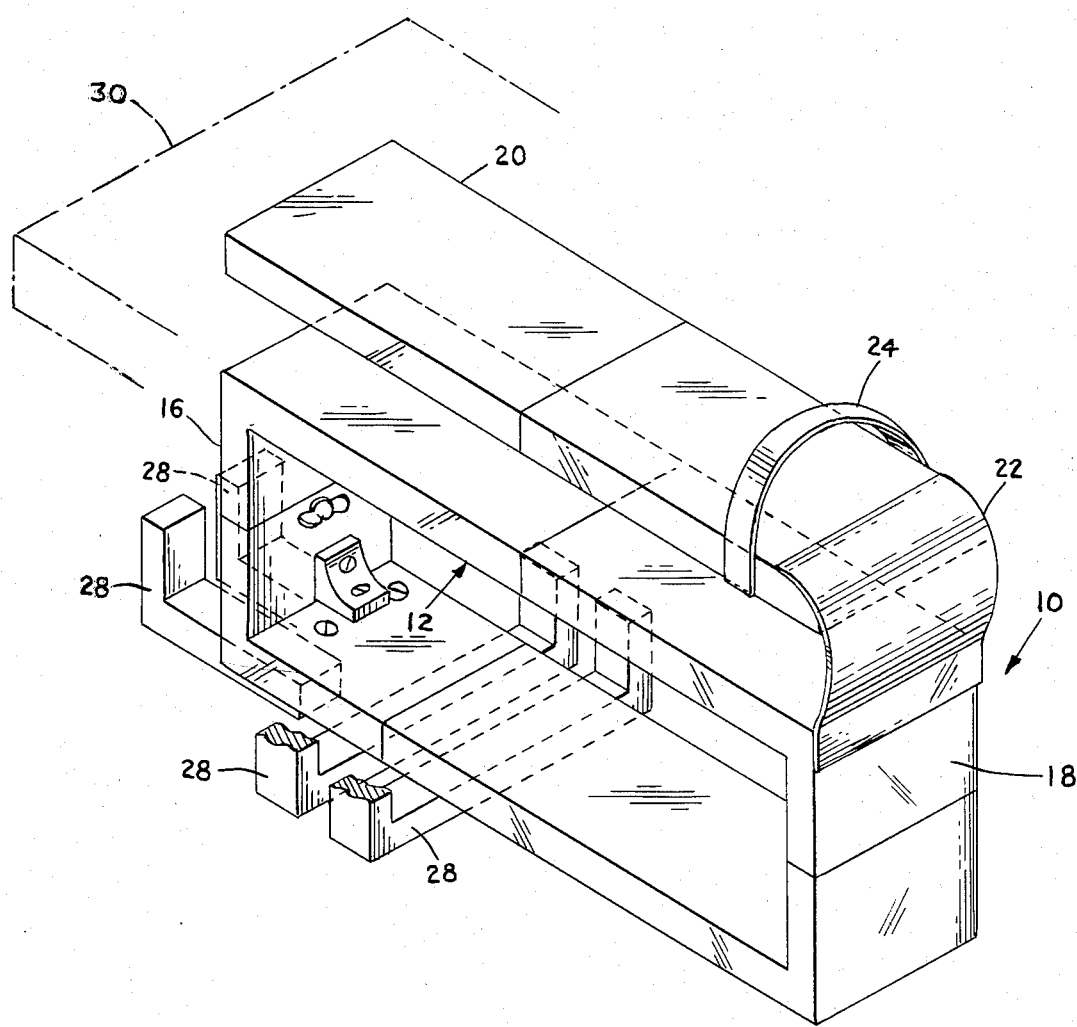
FIG. 1 is a stylized view of the film support of the invention taken in a closed position.
Figure 2:
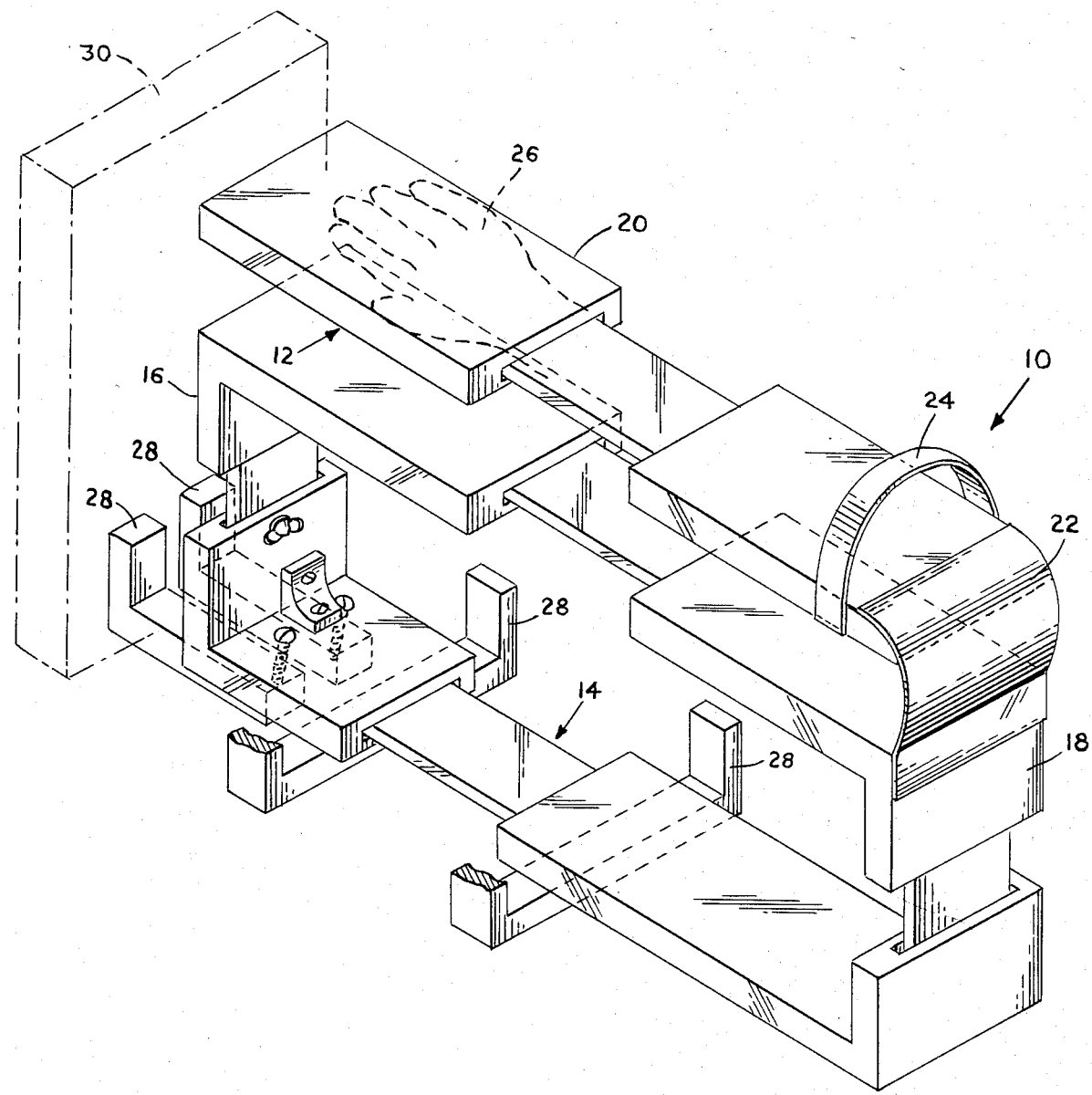
FIG. 2 is a stylized view of the film support of FIG. 1 wherein the legs and braces thereof have been telescoped to the open position, the figure also showing an exemplary hand, in phantom view, secured to the upper side of the film support.

With reference to FIGS. 1 and 2, an X-ray film support 10 is shown constructed in accordance with the invention. The support 10 comprises upper and lower braces 12 and 14, and front and rear legs 16 and 18 which are joined together by the braces 12 and 14. A fold-over flap 20 is secured at the back end of the upper brace 12 by a flexible gusset 22. A binding strap 24 connects with the flap 20 near the gusset 22 for securing a hand or foot to the support 10 during the taking of X-ray pictures. An exemplary hand 26 is shown in phantom view to demonstrate the operation of the support 10.

Stirrups 28 extend transversely from the lower brace 14 for supporting a cassette of X-ray film in any one of the number of positions about the hand 26. One exemplary cassette 30 is shown in phantom view supported by a pair of the stirrups 28 disposed at the front end of the support 10. The two stirrups 28 on the left side can support a cassette, such as the cassette 30, alongside the left side of the hand 26, while the two stirrups 28 on the right side of the support 10 can support a cassette alongside the right side of the hand 26. A cassette may also be positioned between the flap 20 and the upper brace 12 where it nests beneath the hand 26 to provide an X-ray view looking up at the hand 26. In the absence of a cassette between the flap 20 and the upper brace 12, the gusset 22 simply folds over under the weight of the hand 26 so as to bring the flap 20 in contact with the upper brace 12.

The support 10 and the flap 20 are advantageously constructed of telescoping members to permit adjustment of the size of the support 10. Accordingly, the braces 12 and 14 as well as the legs 16 and 18 are constructed in a telescoping format wherein tongues 32 are slidably secured within slots 34 in each of the braces 12 and 14 and in each of the legs 16 and 18.

In operation, the support 10 is initially in its reduced-size configuration, as depicted in FIG. 1, the support 10 being opened to the enlarged configuration of FIG. 2 in preparation for the taking of the X-ray pictures. The legs 16 and 18 may be provided with thumb-screws 36 whereby a tongue 32 is typed within its slot 34 so as to retain the support 10 in its opened configuration for supporting the weight of the hand 26. A cassette 30 is then positioned within a pair of the stirrups 28, or in the space between the flap 20 and the upper brace 12, to obtain an X-ray picture of the hand from a desired direction. The hand 26 is then implaced upon the flap 20 and secured thereto by the strap 24. A source of X-rays (not shown in the figures) of conventional design is then activated to direct X-radiation through the hand 26 to impinge upon the cassette 30.

In the construction of the support 10, the braces 12 and 14, the legs 16 and 18, and the flap 20 are constructed of material which is transparent to the propogation of X-radiation. Thereby, the radiation is free to propogate through the members of the support 10 to provide a clear radiographic picture of the hand 26. By way of example, the members of the support 10 may be fabricated of wood, or of a rigid plastic material such as a polycarbonate. In order to provide rigidity at the junctions of the various members of the support 10, screws 38 of radio-transparent material, such as nylon screws are advantageously employed along with braces 40 to maintain a stable configuration in the presence of any forces which may be exerted on the support 10 by the hand 26. The support 10 is readily disassembled and reassembled for shipping and for long term storage. The heights of the legs 16 and 18 may be adjusted to accommodate the size of the cassette 30 to insure that the hand 26 is set alongside the midportion of the cassette 30. The stirrups 28 may also be attached to the lower brace 14 by means of the foregoing screws 38. Thereby, the invention provides for a film support which is free of cumbersome and complex structures while permitting the taking of pictures from a variety of directions, and extremity of the human body.

It is to be understood that the above-described embodiment of the invention is illustrative only, and that modifications thereof may occur to those skilled in the art. Accordingly, this invention is not to be regarded as limited to the embodiment disclosed herein, but is to be limited only as defined by the appended claims.

I claim:

1. An X-ray film support comprising:
 a front leg and a back leg;
 a lower brace connecting the bottom portion of said front leg with the bottom portion of said back leg;
 an upper brace connecting the upper portion of said front leg with the upper portion of said back leg for support of an object to be X-rayed;
 sitrrups extending laterally from said lower brace for the support of film cassettes alongside said object for receiving X-rays from an X-ray source;
 said legs are of adjustable lengths for aligning the position of said object with said cassette.

2. A film support according to claim 1 wherein each of said legs and each of said braces are of telescoping construction to permit reduction in the size of said support for stowage and for adjustment to limb length.

3. A film support according to claim 2 wherein said stirrups are positioned along the sides of and at an end of said lower brace for supporting said cassette at different locations relative to said object.

4. A film support according to claim 1 further comprising a fold-over flap secured to the back end of said upper brace to be draped over said upper brace and beneath the object to be X-rayed while providing a space between said upper brace and said flap for a film cassette.

5. A film support according to claim 4 wherein said legs are of adjustable length for aligning the position of said object with a cassette supported by one of said stirrups.

6. A film support according to claim 5 wherein said flap includes means for securing said object to said support.

* * * * *